UNITED STATES PATENT OFFICE.

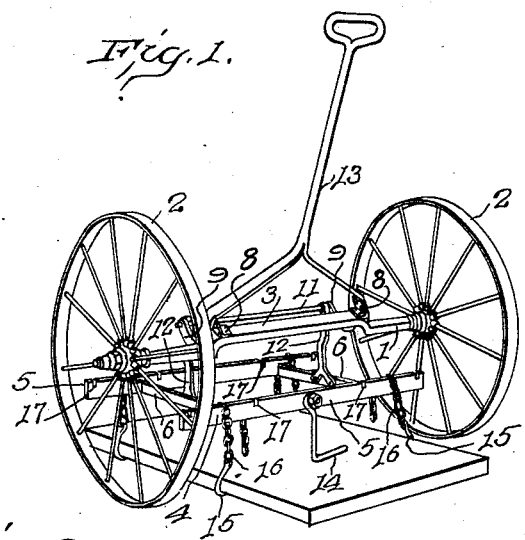

ALVA A. AKE, OF BELLEVUE, OHIO.

LIFTING-TRUCK.

939,783. Specification of Letters Patent. Patented Nov. 9, 1909.

Application filed August 27, 1908. Serial No. 450,444.

*To all whom it may concern:*

Be it known that I, ALVA A. AKE, a citizen of the United States, residing at Bellevue, in the county of Huron and State of Ohio, have invented certain new and useful Improvements in Lifting-Trucks, of which the following is a specification, reference being had therein to the accompanying drawings.

This invention relates to lifting trucks, and is designed more particularly for use in lifting and transporting flat stones and material of a similar character.

The object of the invention is to provide a truck of this character which will be of a light construction and easily propelled, but which will lift a body of great weight with a comparatively slight effort on the part of the operator; which will be easily attached to and detached from the body to be lifted; which may be readily attached to bodies of different sizes; and which will be of a simple, inexpensive construction and at the same time will be very strong and very durable.

With these objects in view my invention consists in certain novel features and in certain combinations and arrangements of parts hereinafter to be described, and then more particularly pointed out in the claims.

In the accompanying drawings, Figure 1 is a perspective view of a truck embodying my invention; Fig. 2 is a transverse sectional view, taken centrally of the axle in Fig. 1; Fig. 3 is a similar view with the handle depressed to elevate the work-supporting frame; and Fig. 4 is a detail view of the fastening means of the supporting frame.

In these drawings I have illustrated the preferred form of my invention and have shown the same as comprising an axle 1 provided with ground wheels 2 and having its central portion bent, as shown at 3, to form a recess or offset portion in the axle for a purpose which will hereinafter appear.

A suitable work-support is suspended beneath the axle 1, and, in the present instance, this support comprises a frame, indicated as a whole by the reference numeral 4 and consisting of side members 5 and cross bars 6 extending between said side members. This frame is eccentrically connected to the axle, whereby, when the axle is rotated about a longitudinal axis, the frame will be elevated or lowered. In the present instance, I have shown the axle as provided with forwardly extending arms 7 which are rigidly secured to the axle 1, preferably by providing brackets 8 which are rigidly secured to the offset portion 3 of the axle and extend some distance above the same. The arms 7 are rigidly secured to the brackets 8 and preferably have their forward ends turned at an agle thereto, as shown at 9, and provided with apertures adapted to receive a rod 11 which extends through the apertured upper ends of links or bars 12 secured at their lower ends to the cross bars 6 of the supporting-frame. The links or bars 12 are so arranged relatively to the forwardly extending arms 7 that the ends of the arms and the bars lie close one to the other, thus minimizing the strain on the connecting pivot or rod 11.

Any suitable means may be provided for rotating the axle 1 about its longitudinal axis, but, in the present instance, I have shown this means as a rearwardly extending handle 13 which serves both to rotate the axle about its longitudinal axis and to propel the truck from point to point. This handle may be secured to the axle 1 in any desired manner, but I prefer to bifurcate the same and form the arms thereof integral with the forwardly extending arms 7 which are secured to the brackets 8 carried by the offset portion 3 of the axle. If desired, a hook 14 may be secured to the rear side member 5 of the supporting-frame in such a position as to engage the handle 13 when the same is in its lowermost position, thus retaining the handle in this position and supporting the work-support and the load carried thereby in their elevated positions.

The load may be secured to the supporting-frame 4 in any desired manner, but I have here shown the frame as provided with hooks 15 adjustably connected to the side members 5 of the supporting frame. In the present instance, these hooks are provided with chains 16 adapted to extend over the side members 5 of the frame and engage notches or recesses 17 formed in the upper edges of said side members, these notches being of a width sufficient to permit the links of the chains 16 to be inserted therein edgewise, but not sufficient to receive the links in their flat or horizontal position. Consequently, when one of the links is inserted edgewise in the notch, the next succeeding link will engage the side member of the frame on the opposite sides of the notch and hold the chain against movement relatively to the side member of the frame. Each side member is preferably provided with a plurality of these notches or recesses, thus enabling the hooks to be secured at different points to accommodate the frame to bodies of different sizes.

The operation of the device will be readily understood from the foregoing description and it will be apparent that when the handle is raised, as shown in Fig. 1, the work-supporting frame 4 will be in its lowermost position, in which position it is secured to the body to be lifted by passing the hooks 15 beneath the edges of said body and connecting the chains 16 of said hooks to the side members of the frame in the manner described. By then depressing the handle 13, the axle 1 will be rotated about its longitudinal axis and the outer ends of the arms 7 elevated in such a manner as to elevate the supporting frame and the work which has been secured thereto. The shape of these arms is such that when they have reached their elevated position the links or bars 12, which connect the same to the work-supporting frame, will lie within the offset portion or recess in the axle 1, thus suspending the load centrally of the truck.

From the above description of the device and its operation it will be apparent that I have provided a truck of this character which is of a very light construction, embodying as it does but a minimum amount of material, and that this truck is so constructed that it will enable a body of great weight to be lifted and transported with comparative ease, thus enabling one man to accomplish work which formerly required the services of two or more men and to accomplish the same work in less time than it was formerly accomplished. It will also be apparent that the body or work to be lifted can be very quickly attached to and detached from the work-support of the truck and that this attaching means can be connected to the supporting frame at different points, thus enabling the same to be accommodated to bodies of different sizes. It will also be apparent that the construction of the truck is of a very simple character and such as to enable the several parts thereof to be constructed of strong durable materials and to require but a minimum amount of work in the construction thereof, thus enabling the device to be produced at a low cost, and that, in consequence of the simple construction and the character of the materials employed therein, the truck is of a very durable construction and contains no parts liable to become broken or disarranged.

I wish it to be understood that I do not desire to be limited to the details of construction shown and described, for obvious modifications will occur to a person skilled in the art.

Having thus fully described my invention, what I claim as new and desire to secure by Letters Patent, is:—

1. A device of the character described comprising an axle having an offset portion, wheels mounted on said axle, and an arm mounted on the offset portion of said axle at a point out of alinement with the vertical plane extending through the ends of said axle, a work-support connected to said arm, and means for moving said arm about a horizontal axis.

2. A device of the character described, comprising an axle having an offset portion, wheels mounted on said axle, an arm rigidly secured to said offset portion of said axle at a point out of alinement with the vertical plane extending through the ends of said axle, and means for rotating said axle about its longitudinal axis.

3. A device of the character described comprising an axle, ground wheels mounted thereon, forwardly extending arms secured to said axle, a work-supporting frame suspended from the outer ends of said arms, means for securing the work beneath said work-supporting frame, and means for rotating said axle to elevate said frame.

4. A device of the character described comprising an axle, ground wheels mounted on said axle, arms secured to said axle, extending beyond the same and having their outer ends bent at an angle thereto, said ends being so arranged that the rotation of said axle about its longitudinal axis in one direction will move the same into substantially the same vertical plane with the ends of said axle, a work-support connected to the ends of said arms, and means for rotating said axle.

5. A device of the character described comprising an axle having its central portion bent rearwardly to form a recess in said axle, ground wheels mounted on said axle, forwardly extending arms mounted on said rearwardly bent portion of said axle and having their outer ends extending upwardly, a work-supporting frame connected to the outer ends of said arms, and means for rotating said axle about its longitudinal axis.

6. A device of the character described comprising an axle having an offset portion, ground wheels mounted thereon, a handle mounted on the offset portion of said axle at a point out of alinement with the vertical plane extending through the ends thereof and having its inner end extending beyond the point of connection to said axle, and a work support connected to said inner end of said handle.

7. A device of the character described comprising an axle, ground wheels mounted thereon, a handle mounted on said axle, extending beyond the opposite sides thereof and having one end turned at an angle to and extending above the body portion of said handle, and a work support secured to said upturned end of said handle.

8. A device of the character described comprising an axle, ground wheels mounted thereon, a handle having its inner end bifurcated and extending beyond said axle, means for rigidly securing the arms of said handle to said axle, and a work-support carried by those portions of said arms extending beyond said axle.

9. A device of the character described comprising an axle, ground wheels mounted thereon, a work-support mounted beneath said axle and comprising a frame having its side members provided with notches, hooks adapted to engage the work, and chains secured to said hooks adapted to be inserted in the notches in the side members of said frame.

10. A device of the character described comprising an axle, ground wheels mounted thereon, forwardly extending arms secured to said axle, a work-support connected to said arms, a handle connected to said axle to rotate the same about its longitudinal axis, and a hook secured to said work-support and adapted to engage said handle to retain the same in its lowermost position.

In testimony whereof, I affix my signature in presence of two witnesses.

ALVA A. AKE.

Witnesses:
R. R. PARKHURST,
LEONARD S. WHELAN.